United States Patent
Herman et al.

(10) Patent No.: US 10,371,281 B2
(45) Date of Patent: Aug. 6, 2019

(54) HYBRID MANUAL AND HYDRAULIC OVERRIDE

(71) Applicant: GE Oil & Gas Pressure Control LP, Houston, TX (US)

(72) Inventors: Christopher Taylor Herman, Houston, TX (US); Mark Anthony Viator, Houston, TX (US); Keith Adams, Houston, TX (US); Fauad Saleem, Houston, TX (US); Travis Kyle McEvoy, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 104 days.

(21) Appl. No.: 15/356,261

(22) Filed: Nov. 18, 2016

(65) Prior Publication Data
US 2017/0067573 A1    Mar. 9, 2017

Related U.S. Application Data

(63) Continuation-in-part of application No. 14/172,277, filed on Feb. 4, 2014, now Pat. No. 9,500,294.

(60) Provisional application No. 61/874,447, filed on Sep. 6, 2013.

(51) Int. Cl.
*F16K 31/122*    (2006.01)
*F16K 3/02*      (2006.01)
*F16K 31/50*     (2006.01)

(52) U.S. Cl.
CPC ........ *F16K 31/1225* (2013.01); *F16K 3/0254* (2013.01); *F16K 31/508* (2013.01)

(58) Field of Classification Search
CPC .... F16K 31/1225; F16K 32/122; F16K 31/50; F16K 31/508; F16K 3/0254
See application file for complete search history.

(56) References Cited

U.S. PATENT DOCUMENTS

| | | | |
|---|---|---|---|
| 4,213,480 A | 7/1980 | Orum et al. | |
| 4,844,407 A | 7/1989 | Baker | |
| 7,677,526 B2 | 3/2010 | Lymberopoulos | |
| 7,913,971 B2 | 3/2011 | Hoang | |
| 2002/0124889 A1 | 9/2002 | Sundararajan | |
| 2003/0034465 A1 | 2/2003 | Adams et al. | |
| 2010/0193715 A1 | 8/2010 | Gethmann | |
| 2012/0199218 A1 | 8/2012 | Gioberti | |

OTHER PUBLICATIONS

International Search Report and Written Opinion issued in connection with corresponding PCT Application No. PCT/US2014/054084 dated Nov. 7, 2014.

*Primary Examiner* — Marina A Tietjen
(74) *Attorney, Agent, or Firm* — Hogan Lovells US LLP

(57) ABSTRACT

An apparatus for overriding a valve actuator to move a valve stem to a second position includes an override body with a central axis. A piston is located within the override body. A bushing is non-rotatably carried within the override body. An override shaft is in threaded engagement with the bushing and extends through a sealed orifice in the override body. Fluid pressure applied to the piston causes the bushing to engage the valve actuator and push the valve stem, and alternatively, rotation applied to the override shaft causes the bushing to move linearly to engage the valve actuator and push the valve stem.

20 Claims, 4 Drawing Sheets

HYBRID MANUAL AND HYDRAULIC OVERRIDE

CROSS REFERENCE TO RELATED APPLICATIONS

This application claims priority to and the benefit of U.S. Provisional Application Ser. No. 61/874,447, filed Sep. 6, 2013, and is a continuation-in-part of, and claims priority to and the benefit of, co-pending U.S. patent application Ser. No. 14/172,277, filed Feb. 4, 2014, the full disclosures of which are hereby incorporated herein by reference in their entirety for all purposes.

BACKGROUND

1. Field of Invention

This invention relates in general to valve actuators, and in particular to an actuator override that incorporates both a manual and hydraulic override.

2. Description of the Prior Art

A gate valve is a valve having a body and a bore through the body. A gate is positioned transverse to the body, and moves linearly to obstruct flow through the bore or allow flow through the bore. Gates typically have an opening that aligns with the bore to allow flow. The gate is sometimes moved, or actuated, by a valve actuator.

The valve actuator can be a pneumatic, diaphragm, piston, or hydraulic type actuator that urges a valve stem toward the valve from a first position to a second position. Urging the stem toward the valve to the second position can either open the valve or close the valve, depending on the design of the valve. A bonnet is usually connected to the valve, with the stem extending through the bonnet, and the actuator is connected to the bonnet. Actuated valves occasionally experience excessive frictional forces and require additional overriding force to fully open or close the valve. In addition, an override may be required in emergency situations in which the seals of the actuator get damaged and cannot contain pressure. In other cases, extreme conditions can cause the seals in an actuator to become damaged and lose their ability to seal, resulting in a loss of function for the actuator. Depending on the forces required to move the valve stem to the second position to open or close the valve, a manual or hydraulic override may be utilized. Operators often do not know which override will be required (manual or hydraulic); therefore, their only option is to procure, and potentially install, both pieces of equipment. It is both costly and time-consuming to carry two pieces of equipment to accomplish the same task.

SUMMARY

Embodiments of this disclosure provide for dual functionality of both a manual and a hydraulic type override assembly in overriding the forces of actuated valves to move the valve stem to a second position to open or close the valve, as applicable. Having dual functionality allows for fewer components to be acquired and transported by operating personnel and requires less operation and installation time than having separate manual and hydraulic override assemblies. Purchasing one assembly that provides both a manual and hydraulic override is both more cost and time efficient. In addition, embodiments of this disclosure have the capability of being a lockopen device for actuated valves.

In an embodiment of this disclosure, an apparatus for overriding a valve actuator to move a valve stem to a second position includes an override body with a central axis. A piston is located within the override body. A bushing is non-rotatably carried within the override body. An override shaft is in threaded engagement with the bushing and extends through a sealed orifice in the override body. Fluid pressure applied to the piston causes the bushing to engage the valve actuator and push the valve stem, and alternatively, rotation applied to the override shaft causes the bushing to move linearly to engage the valve actuator and push the valve stem.

In an alternative embodiment of this disclosure, an apparatus for overriding a valve actuator to move a valve stem to a second position includes an override body with a central axis. The override body has an inner cavity with an open end and a closed end. A bushing is located within the inner cavity. The bushing is axially moveable within the inner cavity and is restrained against rotational movement relative to the override body. The bushing also includes axially extending threads, and an end surface facing the open end of the override body for selectively engaging the valve actuator. A piston is located within the inner cavity. The piston has an outer diameter that engages an inner diameter of the inner cavity. A central opening extends axially through the piston. The piston has a pressure surface facing the closed end of the override body. A port extends through the override body for transferring a pressure media into the inner cavity between the pressure surface of the piston and the closed end of the override body. An override shaft extends through the central opening of the piston, the override shaft having a first end that passes through an orifice in the closed end of the override body and a second end with threads that are for mating with the threads of the bushing. The threads of the override shaft mate with the threads of the bushing so that rotation of the override shaft is translated to axial movement of the bushing.

In another alternative embodiment of this disclosure, a method for overriding a valve actuator to move a valve stem to a second position includes providing an override assembly. The override assembly has an override body with a central axis, a piston located within the override body, a bushing non-rotatably carried within the override body, and an override shaft in threaded engagement with the bushing and extending through a sealed orifice in the override body. The override assembly is releasably connected to the valve actuator. A fluid pressure is applied to the piston to cause the bushing to engage the valve actuator and push the valve stem, and alternatively, applying a rotation to the override shaft causes the bushing to move linearly to engage the valve actuator and push the valve stem.

BRIEF DESCRIPTION OF THE DRAWINGS

Some of the features and benefits of the present invention having been stated, others will become apparent as the description proceeds when taken in conjunction with the accompanying drawings, in which.

DETAILED DESCRIPTION OF THE INVENTION

Figure 1:
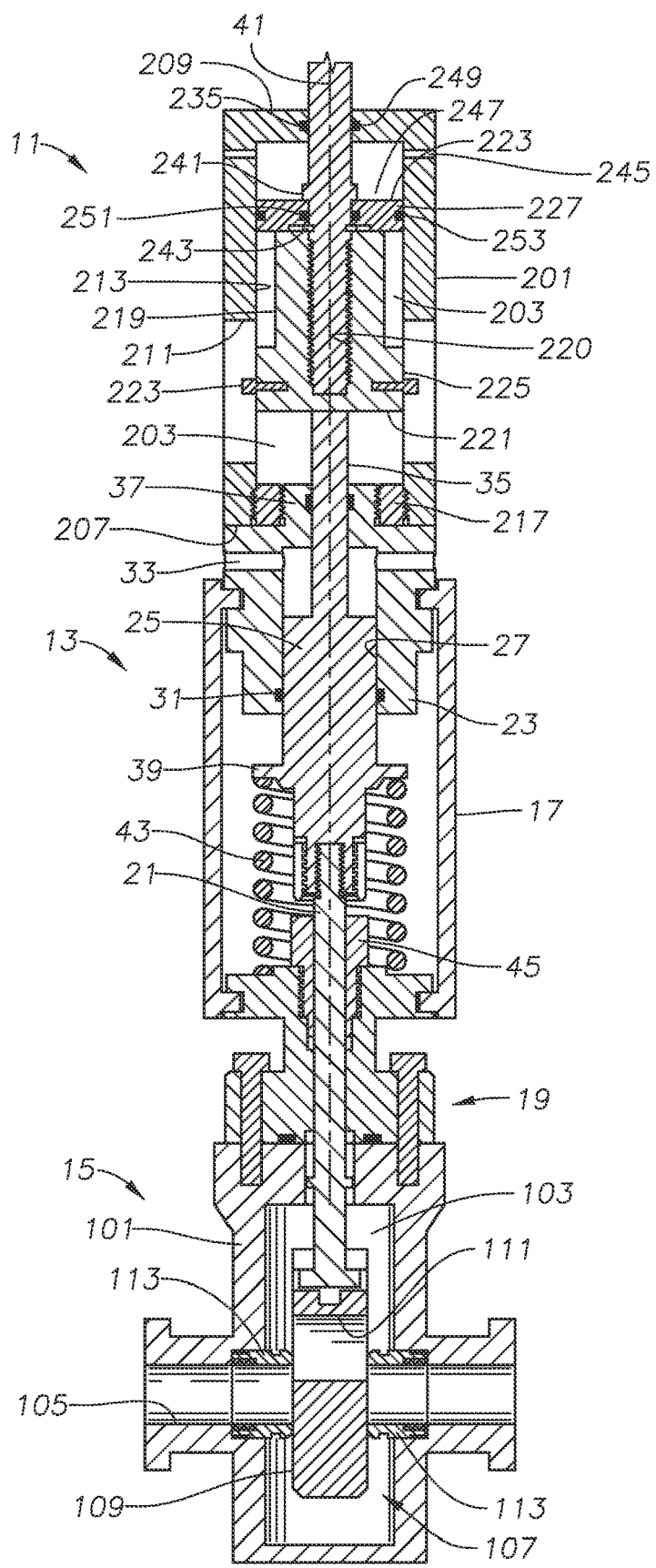
FIG. 1 is a schematic sectional view of an actuator with an override assembly in accordance with an embodiment of this invention.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1 is an example of an override assembly 11 attached to a top end of valve actuator 13. In the embodiment of FIG. 1, valve actuator 13 is a hydraulic piston type actuator for actuating valve 15. Valve actuator 13 includes actuator housing 17, which is connected to bonnet 19. Valve stem 21 extends downward through actuator housing 17 and actuates valve 15. Piston head 23, also called a power head, is mounted to an upper end of actuator housing 17. Piston head 23 has a generally cylindrical outer surface with a groove that accepts a radially inward projecting lip of actuator housing 17. Actuator piston 25, which is substantially cylindrical, coaxially mounts within actuator piston chamber 27 of actuator piston head 23. Actuator seals 31 form a seal between an external surface of actuator piston 25 and an inner surface of actuator piston chamber 27. Actuator ports 33 are each apertures radially extending through actuator piston head 23 and are used to introduce pressurized media into actuator piston chamber 27, or for releasing media from actuator piston chamber 27.

Actuator piston 25 has an actuator stem 35 which extends upward at an upper end of actuator piston 25. Above ports 33, actuator piston head 23 reduces in diameter to define an actuator boss or cap 37. Actuator stem 35 extends axially out of actuator piston head 23 through the actuator cap 37 of actuator piston head 23. A stem seal assembly can form a seal between the inner surface of the opening in actuator cap 37 and actuator stem 35. Actuator cap 37 can have external cap threads 36 located on its outer surface, or can have alternative connection means such as an annular groove, slots, or radial holes.

Actuator piston 25 has a downstop 39 at its lower end which is connected to valve stem 21 so that movement of actuator piston 25 and actuator stem 35 along axis 41 results in axial movement of valve stem 21. A diameter of downstop 39 is greater than diameter of piston 25 to define an upward facing shoulder that is in interfering contact with a lower end of piston head 23. Actuator stem 35 and valve stem 21 are co-axial and therefore share axis 41. Although actuator piston 25 and downstop 39 are shown as a single member, actuator piston 25 and downstop 39 may be two separate members which are secured together to prevent relative movement between actuator piston 25 and downstop 39 when actuator stem 35 is moved in either an upward or downward direction along axis 41. Spring 43 upwardly urges downstop 39, and thus valve stem 21 and actuator piston 25. Actuator piston 25 can move downward until the bottom downward facing surface of downstop 39 contacts an actuator block 45, which is located at a lower end of actuator housing 17 and connected to bonnet 19. As actuator piston 25 moves downward, valve stem 21 and a gate 107 of valve 15 move from an FIG. 1 valve 15 is closed in the first position and is open in the second position.

Valve 15 is a gate valve with a valve body 101 housing a chamber 103 therein. A passage 105 formed through the valve body 101 intersects the chamber 103. A gate 107 is shown within the chamber 103. Gate 107 is a generally planar member having a solid portion 109 and an opening 111 formed through the solid portion 109. Gate 107 is selectively slidable within the chamber 103. Annular valve seats 113 are shown co-axially located in the passage 105, each having an end extending into the chamber 103. In the embodiment of the valve 15 shown in FIG. 1, the opening 111 is partially registered with the passage 105.

Although valve actuator 13 is shown and described herein as a hydraulic piston type actuator, and valve 15 is described as a gate valve, override assembly 11 can be utilized with any actuator that has a top shaft or rising stem that is directly or indirectly connected to a valve stem that moves axially of any type of valve. Valve 15 can be, for example, associated with a wellhead assembly that is disposed over a well (e.g., an oil well). The wellhead assembly can include a wellhead housing, a production tree over the housing and flow lines connected to the tree or the wellhead assembly. The flow lines and wellhead assembly can include embodiments of valve 15 described herein. Valve 15 can also be used for regulating fluids that are designated for entry into the wellhead assembly or for regulating well and other fluids that are otherwise travelling along a pipeline.

Looking at FIGS. 1-4, override apparatus 11 has an override body 201. Override body 201 can be a generally cylindrical member with an inner cavity 203 and a central axis 205. Inner cavity 203 has an open end 207 and a closed end 209 opposite open end 207. Override body 201 has at least one axially extending guide slot 211 located within inner cavity 203. Guide slots 211 can be formed within the sidewall of override body 201, extending radially outward from the inner diameter 213 of inner cavity 203, or can extend all the way through the sidewall of override body 201, as shown in FIGS. 1-4. Override body 201 can have internal threads 215 on the inner diameter 213 of inner cavity 203 proximate to the open end 207 of override body 201. Internal threads 215 can be used to releasably connect the override body 201 to the valve actuator 13. Internal threads 215 can first be connected to an annular hub 217. Annular hub 217 has external threads for mating with internal threads 215 and can also have internal threads for mating with the external threads of actuator cap 37. Annular hub 217 can be interchangeable and selected to fit the actuator cap 37 of multiple different valve actuators 13. In alternative embodiments, internal threads 215 of override body 201 can thread directly on to actuator cap 37. In other alternative embodiments, instead of internal threads, override body 201 or annular hub 217 can have an alternative connector for releaseably connecting the override body 201 to the valve actuator 13, such as, for example, clamps, bolts, or J slot arrangements.

Override assembly 11 also includes a bushing 219. Bushing 219 is non-rotatably carried within override body 201. Bushing 219 is a generally tubular member located within inner cavity 203. Bushing 219 has an axially extending receptacle 220. Receptacle 220 is open towards the closed end 209 of override body 201 and closed at its opposite end so that it does not extend entirely axially through bushing 219. Receptacle 220 has internal threads 222 that can generally extend the length of receptacle 220. Bushing 219 has an end surface 221 that faces the open end 207 of override body 201. When the override assembly 11 is connected to a valve actuator 13, end surface 221 can contact an end of actuator stem 35 of valve actuator 13 to move actuator stem 35 towards valve 15. As actuator stem 35 moves towards valve 15, actuator piston 25 causes valve stem 21 to also move towards valve 15 to the second position. In this manner, bushing 219 can engage the valve actuator 13 and push the valve stem 21 to the second position.

Bushing 219 also includes at least one anti-rotation pin 223. One end of each anti-rotation pin 223 extends into a guide slot 211, preventing relative rotational movement between bushing 219 and override body 201. The other end of each anti-rotation pin 223 is attached to bushing 219. For example, each anti-rotation pin 223 can be a threaded member that engages threaded holes in bushing 219. Anti-rotation pins 223 can be utilized as position indicators. By viewing into guide slots 211, an operator can visually monitor the axial location of anti-rotation pins 223, and therefore the axial location of bushing 219 in order to assist the operator in determining the position of the valve stem 21. In alternative embodiments, sensors and circuitry can be utilized to determine the position of anti-rotation pins 223 and this information can be transmitted to remote locations to assist the operator in determining the position of the valve stem 21.

Bushing 219 can have a larger diameter portion 225 with an outer diameter that is proximate to the inner diameter 213 of inner cavity 203. Anti-rotation pins 223 can be located in the larger diameter portion 225 of bushing 219. In alternative embodiments, anti-rotation pins 223 could instead extend from override body 201 into inner cavity 203. In such an embodiment, guide slots 211 would be located on bushing 219 and an end of each anti-rotation pin 223 would extend into the guide slots 211 of bushing 219.

Override apparatus 11 also has a piston 227. Piston 227 is located within the inner cavity 203 of override body 201 between the closed end 209 of override body 201 and bushing 219. An outer diameter 229 of piston 227 engages the inner diameter 213 of the inner cavity 203. Piston 227 has a central opening 231 along axis 205. A pressure surface 233 of piston 227 faces the closed end 209 of override body 201. In alternative embodiments, bushing 219 could be located between the piston 227 and the closed end 209 override body 201. In such an embodiment, an end surface of piston 227 opposite the pressure surface 233 can contact an end of actuator stem 35 to urge actuator stem 35 towards valve 15, which in turn causes valve stem 21 to move towards valve 15 to the second position.

Figure 3:
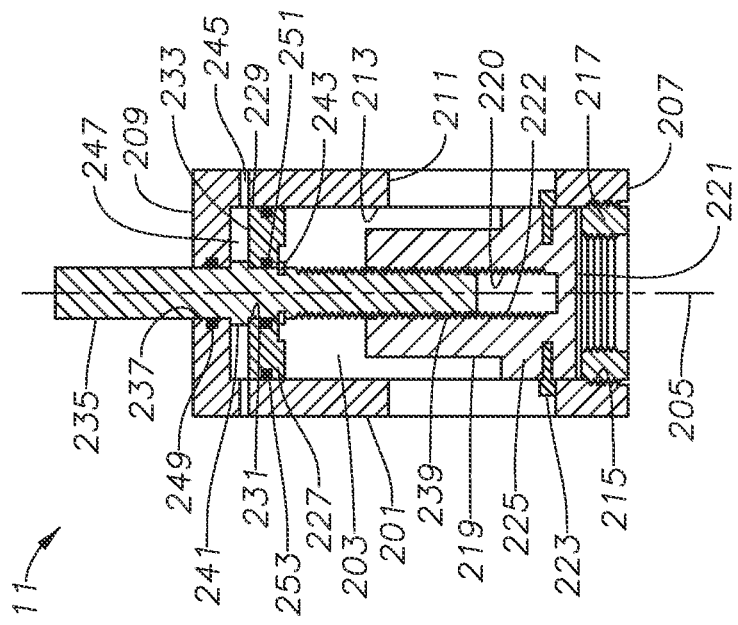
FIG. 3 is a sectional view of the override assembly of FIG. 1, positioned to locate a valve stem in the second position by rotation of the override shaft.

An override shaft 235 is in threaded engagement with the bushing 219 and extends through a sealed orifice 237 in the override body 201. Override shaft 235 extends through the central opening 231 of piston 227. Override shaft 235 is a generally cylindrical axially extending member with a first end that passes through orifice 237 in the closed end 209 of the override body 201. A second end of override shaft 235 extends into receptacle 220 of bushing 219. The second end of override shaft 235 has external threads 239 that mate with the internal threads 222 of receptacle 220. External threads 239 can be, for example trapezoidal or Acme shaped threads, to allow override shaft 235 to act as a power screw. External threads 239 can extend along a length of the override shaft 235 generally equal to the depth of receptacle 220 of bushing 219. When the override shaft 235 is rotated, the guide slots 211 restrict the rotation of anti-rotation pins 223, thereby restricting the relative rotation of the bushing 219 within override body 201. Because anti-rotation pins 223 will not allow rotation of the bushing 219, the bushing 219 is driven up or down the threads 239 of the override shaft 235. In this manner, rotational movement of override shaft 235 is converted to linear movement of bushing 219. When valve stem 21 is in the first position, override shaft 235 is in a contracted position and a maximum extent of override shaft 235 is located within receptacle 220 of bushing 219. When override shaft 235 is rotated so that bushing 219 is driven down the threads 239 of override shaft 235, override shaft 235 is in an extended position with a lesser extent of override shaft 235 being located within receptacle 220 of bushing 219 (FIG. 3).

The direction of travel of bushing 219 is determined by the direction of rotation of override shaft 235. For example, when the override shaft 235 is rotated clockwise, bushing 219 can be driven down the threads 239 of override shaft 235 and when the override shaft 235 is rotated counterclockwise, bushing 219 can be driven up the threads 239 on override shaft 235. Override shaft 235 can be rotated with a hand wheel or other manual type device known in the art.

The threads 239 of the override shaft 235 and the threads 222 of receptacle 220 can mate in such a way that when the override shaft 235 is in an extended position, the interaction of threads 239 of the override shaft 235 with the threads 222 of the receptacle 220 of bushing 219 prevent movement of the override shaft 235 towards the contracted position from forces applied by the actuator stem 35 on the bushing 219. This provides a means for locking the valve stem 21 in the second position. In order for the override shaft 235 to return to the contracted position, manual rotation of the override shaft 235 by the operator is required.

In alternative embodiments, bushing 219 can instead be a mandrel with external threads and override shaft 235 can have a larger diameter portion with a sleeve having internal threads that mate with the external threads of override shaft 235. In such an embodiment, override shaft 235 would also act as a power screw so that rotational movement of override shaft 235 is converted to linear movement of bushing 219.

Override shaft 235 has a circumferential flange 241 located between the closed end 209 of override body 201 and the pressure surface 233 of piston 227. Circumferential flange 241 has a shoulder that engages the pressure surface 233 of piston 227, limiting relative axial movement between the override shaft 235 and piston 227. An annular retainer ring 243 also limits relative axial movement between the override shaft 235 and piston 227. Retainer ring 243 has an inner edge that engages a groove in the override shaft 235 and an outer edge that engages piston 227.

A port 245 extends through the override body 201 and into the inner cavity 203 for transferring pressure media into the inner cavity 203. The port is located to deliver pressure media to the pressure chamber 247, the pressure chamber 247 being defined by the pressure surface 233 of piston 227, the inner diameter 213 of the inner cavity 203, and the closed end 209 of override body 201. As an alternative to, or in addition to moving valve stem 21 to the second position by rotation of the override shaft 235, pressure media can be injected through port 245 and into the pressure chamber 247 to urge bushing 219 towards the open end 207 of override body 201 to engage the valve actuator 13 and push the valve stem 21 the second position.

Circular seals 249, 251, 253 prevent pressure and fluids from escaping pressure chamber 247. Circular stem seal 249 is located between the orifice 237 in the closed end 209 of the override body 201 and the override shaft 235 for creating a pressure and fluid seal between the override body 201 and the override shaft 235. Circular piston inner diameter seal 251 is located between the central opening 231 of the piston 227 and the override shaft 235 for creating a pressure and fluid seal between the piston 227 and the override shaft 235. Circular piston outer diameter seal 253 is located between the outer diameter of the piston 227 and the inner diameter 213 of the inner cavity 203 for creating a pressure and fluid seal between the piston 227 and the inner cavity 203.

In an example of operation, if an operator desires to move a valve stem 21 to a second position with either a manual or hydraulic method, override apparatus 11 can be utilized. The operator can connect the open end 207 of override body 201 to valve actuator 13. To do this, the operator can select an annular hub 217 that is sized to fit the size and connector type of actuator cap 37 of the valve actuator 13 to be operated. Annular hub 217 can be threaded onto the internal threads 215 of the override body 201 with the external threads of annular hub 217. The connector of annular hub 217 can then be connected to the valve actuator 13. For example, the internal threads of annular hub 217 can then be threaded onto the threads of actuator cap 37 to secure the override apparatus 11 to the valve actuator 13. When mounted, axis 205 of override assembly 11 is collinear with axis 41.

If the operator desires to use a manual method for moving the valve stem 21 to the second position, override shaft 235 can be rotated relative to override body 201 with a hand wheel or other known method. Override shaft 235 will be rotated in a direction that will cause bushing 219 to be driven down the threads 239 of override shaft 235 and move override shaft 235 to the extended position. As seen in FIG. 3, end surface 221 can contact an end of actuator stem 35 of the valve actuator 13 to move actuator stem 35 towards valve 15. As actuator stem 35 moves towards valve 15, actuator piston 25 causes valve stem 21 to also move towards valve 15 to the second position. In this manner, bushing 219 can engage the valve actuator 13 and push the valve stem 21 to the second position. The operator can monitor the progress of the movement of bushing 219 by viewing anti-rotation pins 223 through guide slots 211.

When valve stem 21 is in the second position after manual operation, piston 227 remains proximate to the closed end 209 of override body 201. Override shaft 235 does not travel axially towards the open end 207 of override body 201 and the circumferential flange 241 of override shaft 235 remains in contact with the closed end 209 of override body 201. Instead, override shaft 235 travels out of receptacle 220 as bushing 219 moves towards closed end 209 of the override body 201. Threads 239 of the override shaft 235 and threads 222 of receptacle 220 can mate in such a way that when override shaft 235 is in the extended position, they prevent relative rotational movement between override shaft 235 and bushing 219 without manual rotation of the override shaft 235. This will prevent valve stem 21 from moving towards the first position from the forces applied by the actuator stem 35 on bushing 219, providing a means for locking the valve stem 21 in the second position. As bushing 219 moves downward, it can overcome the frictional forces, closing forces, and other overriding forces that the valve actuator 13 itself would be used to overcome.

Figure 2:
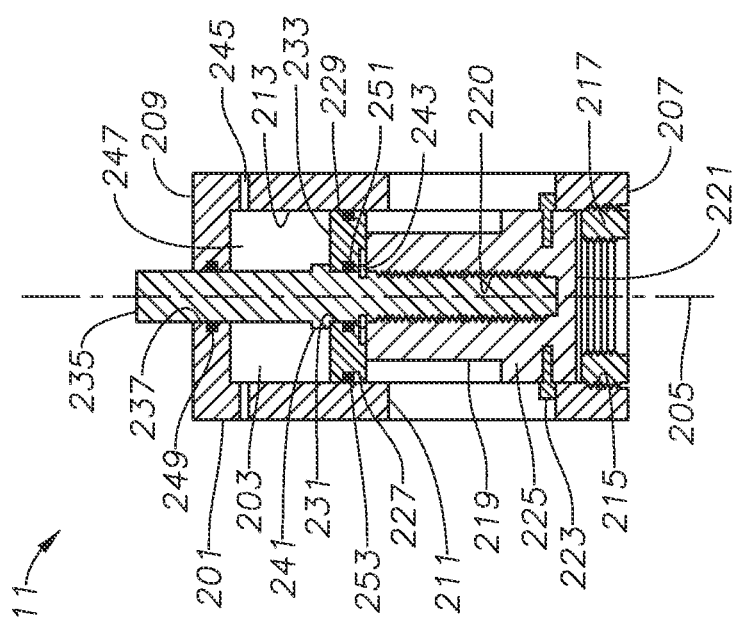
FIG. 2 is a sectional view of the override assembly of FIG. 1, positioned to locate a valve stem in the second position by hydraulic override.
Figure 4:
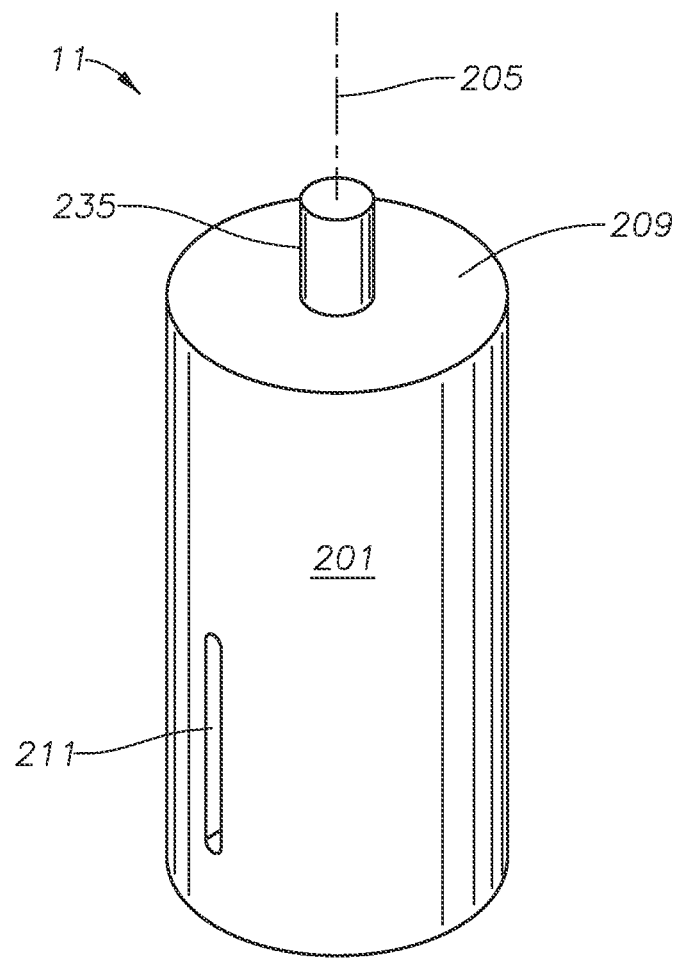
FIG. 4 is a perspective view of the override assembly of FIG. 1 showing a guide slot.

Turning to FIG. 2, if desired, hydraulic actuation of the override assembly 11 can be used instead of, or in conjunction with, mechanical actuation. In the case of hydraulic actuation of the override assembly 11, pressure media is pumped through port 245 to pressurize the pressure chamber 247. Piston 227 can be axially restrained on override shaft 235 between the circumferential flange 241 and the retainer ring 243. When the pressure chamber 247 is pressurized, force is applied to the pressure surface 233 of piston 227 and results in piston 227 being urged downwards and ultimately lowering the drivetrain assembly (which includes override shaft 235, bushing 219, piston 227, retainer ring 243, anti-rotation pins 223, piston inner diameter seal 251, and piston outer diameter seal 253). Pressure from within pressure chamber 247 can be released through port 245 allowing forces internal to the valve actuator 13 or valve 15, such as spring 43, to raise the drivetrain assembly.

As with the mechanical method, in the hydraulic method, as bushing 219 moves downward, it can overcome the frictional forces, closing forces, and other overriding forces that the valve actuator 13 itself would be used to overcome. As seen in FIG. 2, end surface 221 can contact an end of actuator stem 35 of valve actuator 13 to move actuator stem 35 towards valve 15. As actuator stem 35 moves towards valve 15, actuator piston 25 causes valve stem 21 to also move towards valve 15 to the second position. In this manner, bushing 219 can engage the valve actuator 13 and push the valve stem 21 to the second position. The operator can monitor the progress of the movement of bushing 219 by viewing anti-rotation pins 223 through guide slots 211.

The hydraulic and manual methods can be used independently or together. For example, an operator can override the valve actuator 13 by using only the manual rotation of override shaft 235 or by using only the hydraulic method disclosed herein. Alternatively, an operator can use a combination of the hydraulic and manual method to achieve his desired results.

Purchasing one assembly that provides both a manual and hydraulic override is both more cost and time efficient. Override assembly 11 utilizes a unique drive system that allows each override system (manual or hydraulic) to function independently. Embodiments of this disclosure allow for the operator to vary the method in which the override force is applied without physically changing or replacing components on the assembly. In addition, embodiments of this disclosure have the capability of being a lockopen device for actuated valves. Embodiments herein are portable and can be carried by one person.

Figure 5:
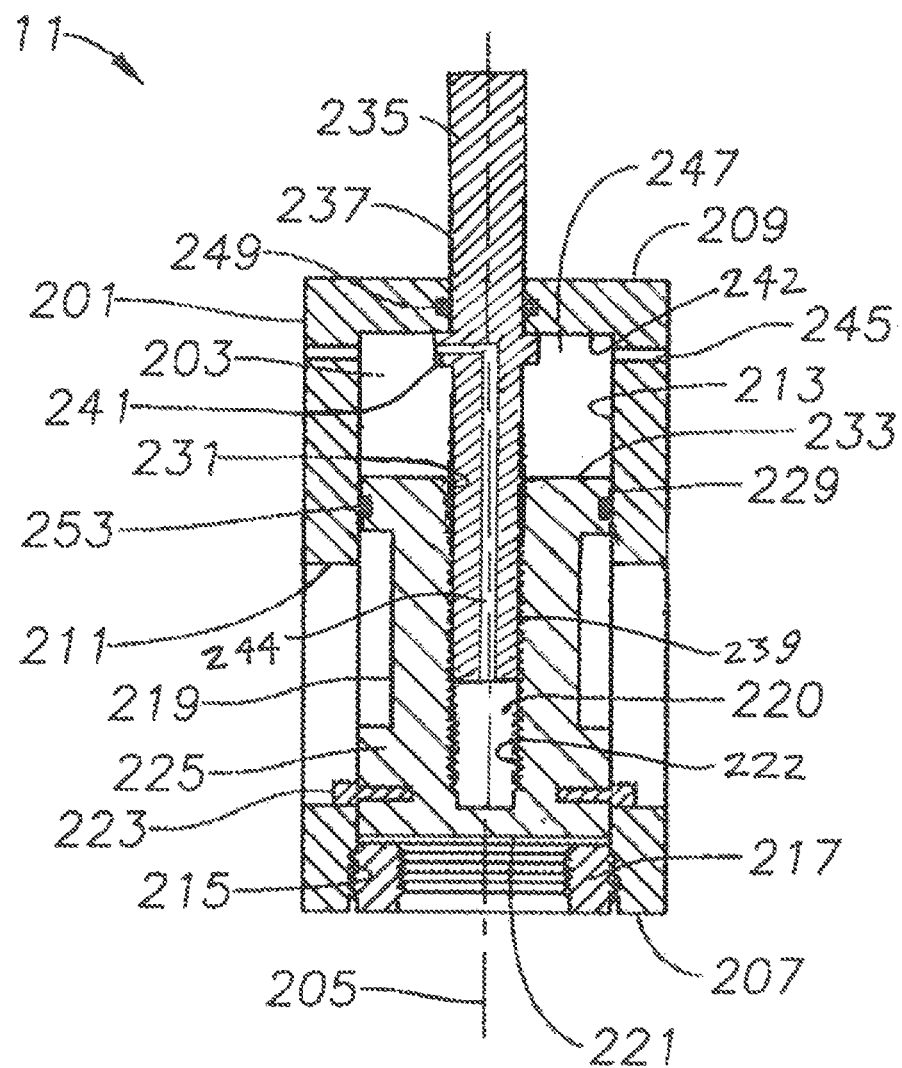
FIG. 5 is a sectional view of an override assembly according to an alternate embodiment of the technology.

Referring now to FIG. 5, there is shown an embodiment of the override assembly 11 wherein the hydraulic override first moves the bushing 219 into the second position, and then the bushing 219 can be manually locked in place. In the embodiment of FIG. 5, for example, pressure media can be pumped through port 245 to pressurize the pressure chamber 247. When the pressure chamber 247 is pressurized, force is applied to the pressure surface 233 of the bushing 219 and results in the bushing 219 being urged downwards and ultimately lowering the drivetrain assembly (which includes override shaft 235, bushing 219, anti-rotation pins 223, and piston outer diameter seal 253). As bushing 219 moves downward, it can overcome the frictional forces, closing forces, and other overriding forces that the valve actuator 13 itself would be used to overcome. The operator can monitor the progress of the movement of bushing 219 by viewing anti-rotation pins 223 through guide slots 211.

Similar to certain embodiments shown and described above, the override shaft 235 of the embodiment of FIG. 5 is in threaded engagement with the bushing 219 and extends through a sealed orifice 237 in the override body 201. Override shaft 235 extends through the central opening 231 of the bushing 219. Override shaft 235 is a generally cylindrical axially extending member with a first end that passes through orifice 237 in the closed end 209 of the override body 201. A second end of override shaft 235 extends into receptacle 220 of bushing 219. The second end of override shaft 235 has external threads 239 that mate with the internal threads 222 of receptacle 220. External threads 239 can be, for example, trapezoidal or Acme shaped threads. External threads 239 can extend along a length of the override shaft 235 generally equal to the depth of receptacle 220 of bushing 219. During the hydraulic override operation, the override shaft 235 can be substantially fully threaded in the receptacle 220 so that when the bushing 219 arrives in the second position, the override assembly appears substantially as depicted in FIG. 2 (minus the retainer ring 243 and optionally minus the piston 227).

After hydraulic actuation of the override assembly 11, the override shaft can be rotated relative to the bushing 219. Specifically, when the override shaft 235 is rotated, the guide slots 211 restrict the rotation of anti-rotation pins 223, thereby restricting the relative rotation of the bushing 219 within override body 201. Because anti-rotation pins 223 will not allow rotation of the bushing 219, and hydraulic pressure is applied downward on the pressure surface 233 of the bushing 219, thereby holding the bushing 219 in the second position, the override shaft 235 is driven upward relative to the bushing 219. In other words, rotational movement of override shaft 235 is converted to linear movement of override shaft 235 relative to the bushing 219.

The threads 239 of the override shaft 235 and the threads 222 of receptacle 220 can mate in such a way that when the override shaft 235 is retracted upward to where the circumferential flange 241 contacts the inner surface 242 of the override body 201, interaction of threads 239 of the override shaft 235 with the threads 222 of the receptacle 220 of bushing 219 prevent movement of the override shaft 235 towards the contracted position from forces applied by the actuator stem 35 on the bushing 219. This provides a means for locking the valve stem 21 in the second position after hydraulic actuation of the override assembly 11.

Also shown in FIG. 5 is a port 244 extending through the override shaft 235 and providing fluid communication between the inner cavity 203 of the override body 201 and the receptacle 220. One purpose of the port 244 is to allow fluid to enter the receptacle 220 as the override shaft 235 is retracted relative to the bushing 219. Without such fluid communication, a vacuum could develop in the receptacle, inhibiting the ability of the override shaft 235 to retract relative to the bushing 219. Alternative methods to alleviating any potential vacuum in the receptacle 220 could include provision of a pressurized air source capable of expanding to fill the receptacle 220 as the override shaft 235 is retracted.

The terms "vertical", "horizontal", "upward", "downward", "above", and "below" and similar spatial relation terminology are used herein only for convenience because valve 15 may be installed in various positions, other than with the valve stem 21 pointing upward.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

That claimed is:

1. An apparatus for overriding a valve actuator to move a valve stem from a first position to a second position, the apparatus comprising:
    an override body with a central axis;
    a piston located within the override body;
    a bushing non-rotatably carried within the override body; and
    an override shaft in threaded engagement with the bushing and extending through an inner cavity in the override body; wherein
    fluid pressure applied to the piston causes the bushing to engage the valve actuator and push the valve stem into the second stem position, and rotation applied to the override shaft moves the override shaft into engagement with the override body and locks the valve stem in the second position.

2. The apparatus of claim 1, wherein:
    the override body has an inner cavity with at least one axially extending guide slot within the inner cavity; and
    the bushing has at least one anti-rotation pin that extends into one of the at least one guide slot to prevent relative rotational movement between the bushing and the override body.

3. The apparatus of claim 1, wherein:
    the bushing has an axially extending receptacle with internal threads; and
    the override shaft has an end with external threads that mate with the internal threads of the receptacle so that rotation of the override shaft is translated to axial movement of the bushing.

4. The apparatus of claim 1, wherein:
    the bushing has an axially extending receptacle with internal threads; and
    the override shaft has external threads that extend along a length of the override shaft generally equal to a depth of the receptacle.

5. The apparatus of claim 1, further comprising a port extending through the override body for selectively injecting a pressure media into the override body to apply fluid pressure to the piston.

6. The apparatus of claim 1, wherein the override shaft extends through a central opening of the piston, the piston further having:
    an outer diameter that engages an inner diameter of the override body;
    a circular piston inner diameter seal located between the central opening of the piston and the override shaft; and
    a circular piston outer diameter seal located between the outer diameter of the piston the inner diameter of the override body.

7. The apparatus of claim 1, wherein the bushing defines an orifice for receiving the override shaft, the apparatus further comprising a port in the override shaft fluidly connecting the inner cavity in the override body and the orifice of the bushing.

8. An apparatus for overriding a valve actuator to move a valve stem from a first stem position to a second stem position, the apparatus comprising:

an override body with a central axis, the override body having an inner cavity with an open end and a closed end;

a bushing located within the inner cavity, the bushing being axially moveable within the inner cavity between a first bushing position and a second bushing position, respectively, and being restrained against rotational movement relative to the override body, the bushing further having axially extending threads, and an end surface facing the open end of the override body for selectively engaging the valve actuator;

a piston located within the inner cavity, the piston having:

an outer diameter that engages an inner diameter of the inner cavity, a central opening extending axially through the piston, and a pressure surface facing the closed end of the override body;

a port extending through the override body for transferring a pressure media into the inner cavity between the pressure surface of the piston and the closed end of the override body; and an override shaft extending through the central opening of the piston, the override shaft having a first end that passes through an orifice in the closed end of the override body and a second end with threads for mating with the threads of the bushing, wherein the threads of the override shaft mate with the threads of the bushing so that rotation of the override shaft is translated to axial movement of the override shaft relative to the bushing until the override shaft engages the override body and locks the bushing in the second bushing position.

9. The apparatus of claim 8, wherein the bushing has an axially extending receptacle open towards the closed end of the override body and the threads of the bushing are internal threads located within the receptacle.

10. The apparatus of claim 8, wherein the override shaft has a circumferential flange with a shoulder for engaging the override body and limiting relative axial movement between the override shaft and the override body.

11. The apparatus of claim 8, wherein the bushing defines an orifice for receiving the override shaft, the apparatus further comprising a port in the override shaft fluidly connecting the inner cavity in the override body and the orifice of the bushing.

12. The apparatus of claim 8, wherein when the override shaft is in an extended position, the threads of the override shaft mate with the threads of the bushing to prevent movement of the override shaft towards a contracted position by forces applied by the valve actuator on the bushing.

13. The apparatus of claim 8, wherein the override body has a connector proximate the open end of the override body for releasably connecting the override body to the valve actuator.

14. The apparatus of claim 8, further comprising a circular stem seal located between the orifice in the closed end of the override body and the override shaft for creating a pressure and fluid seal between the override body and the override shaft.

15. The apparatus of claim 8, further comprising a circular piston inner diameter seal located between the central opening of the piston and the override shaft for creating a pressure and fluid seal between the piston and the override shaft.

16. The apparatus of claim 8, further comprising a circular piston outer diameter seal located between the outer diameter of the piston the inner diameter of the inner cavity for creating a pressure and fluid seal between the piston and the inner cavity.

17. The apparatus of claim 8, wherein:

the inner cavity has at least one axially extending guide slot; and the bushing has at least one anti-rotation pin that extends into one of the at least one guide slot to prevent relative rotational movement between the bushing and the override body.

18. The apparatus of claim 17, wherein each guide slot extends through a side wall of the inner cavity for selectively viewing the anti-rotation pins to determine the location of the bushing.

19. A method for overriding a valve actuator to move a valve stem from a first position to a second position, the method comprising:

(a) providing an override assembly, the override assembly having an override body with a central axis, a piston located within the override body, a bushing non-rotatably carried within the override body, and an override shaft in threaded engagement with the bushing and extending through a sealed orifice in the override body;

(b) releasably connecting the override assembly to the valve actuator;

(c) applying a fluid pressure to the piston to cause the bushing to engage the valve actuator and push the valve stem, and (d) locking the position of the bushing relative to the override body through engagement of the override shaft with the override body, and simultaneous threaded engagement between the override shaft and the bushing.

20. The method of claim 19, wherein step (c) includes applying a fluid pressure to the piston by injecting a pressure media into the override body through a port extending through the override body.

* * * * *